United States Patent
Vora et al.

(10) Patent No.: US 11,897,474 B1
(45) Date of Patent: Feb. 13, 2024

(54) FUEL EFFICIENT OPERATION MODE

(71) Applicant: CNH Industrial America LLC, New Holland, PA (US)

(72) Inventors: Kushan Vora, Westmont, IL (US); Joseph Shoemaker, West Burlington, IA (US); Haibo Guo, Naperville, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 18/138,958

(22) Filed: Apr. 25, 2023

(51) Int. Cl.
| | |
|---|---|
| *B60W 10/103* | (2012.01) |
| *B60W 30/188* | (2012.01) |
| *F02D 29/04* | (2006.01) |
| *F16H 61/42* | (2010.01) |
| *E02F 9/22* | (2006.01) |
| *E02F 9/20* | (2006.01) |
| *B60W 10/06* | (2006.01) |

(52) U.S. Cl.
CPC ........ *B60W 30/1882* (2013.01); *B60W 10/06* (2013.01); *B60W 10/103* (2013.01); *E02F 9/2066* (2013.01); *E02F 9/2235* (2013.01); *E02F 9/2296* (2013.01); *F02D 29/04* (2013.01); *F16H 61/42* (2013.01); *B60W 2510/0638* (2013.01); *B60W 2710/0644* (2013.01); *F02D 2200/101* (2013.01); *F02D 2200/60* (2013.01)

(58) Field of Classification Search
CPC ..... E02F 9/2066; E02F 9/2235; E02F 9/2296; F16H 61/42; F02D 29/04; F02D 2200/101; F02D 2200/60; B60W 10/06; B60W 10/103; B60W 30/1882; B60W 2510/0638; B60W 2710/0644

USPC ........... 477/115, 52, 108; 700/282; 701/101
See application file for complete search history.

(56) References Cited

U.S. PATENT DOCUMENTS

| | | | |
|---|---|---|---|
| 9,096,211 B2 | 8/2015 | Kamisetty et al. | |
| 9,671,763 B2 | 6/2017 | Ishihara et al. | |
| 9,822,510 B2 | 11/2017 | Sakamoto et al. | |
| 9,855,951 B1 * | 1/2018 | Lister | B60W 10/06 |
| 10,487,477 B2 | 11/2019 | Yun et al. | |
| 10,836,427 B2 | 11/2020 | Flaxman | |

(Continued)

FOREIGN PATENT DOCUMENTS

JP          2678355 B2 * 11/1997

*Primary Examiner* — Roger L Pang
(74) *Attorney, Agent, or Firm* — Rickard K. DeMille; Rebecca L. Henkel; Peter K. Zacharias

(57) ABSTRACT

A system includes a vehicle controller which includes a memory configured to store instructions and one or more processors. The vehicle controller is configured to set a fuel efficient operation mode. The fuel efficient operation mode includes setting a commanded engine speed to a nominal engine speed located within a range of optimal fuel efficiency engine speeds of a brake specific fuel consumption map. The fuel efficient operation mode also includes instructing an engine to operate at the commanded engine speed. The fuel efficient operation mode also includes determining a monitored engine speed. The fuel efficient operation mode also includes adjusting a commanded pump displacement in response to the monitored engine speed exceeding the range of optimal fuel efficiency engine speeds. The fuel efficient operation mode also includes instructing a hydraulic pump to operate at the commanded pump displacement.

20 Claims, 3 Drawing Sheets

(56) References Cited

U.S. PATENT DOCUMENTS

| | | |
|---|---|---|
| 10,900,506 B2 | 1/2021 | Kim |
| 2010/0174456 A1 | 7/2010 | Beaudoin et al. |
| 2014/0257578 A1 | 9/2014 | Kim |
| 2016/0339917 A1* | 11/2016 | Aardema .......... B60W 30/1882 |
| 2018/0119391 A1* | 5/2018 | Kondo ................ F02D 41/3005 |

* cited by examiner

FUEL EFFICIENT OPERATION MODE

BACKGROUND

The present disclosure relates generally to a vehicle control system used for achieving higher fuel efficiency for work vehicles that utilize hydraulic drives.

Work vehicles, such as dozers and other machinery, frequently utilize hydrostatic drives as means of controlling ground speed in a variety of scenarios. Two common scenarios include driving the vehicle at a high speed while moving a light load and driving at a slow speed while moving a heavy load. For example, a skid steer with a bucket fully-loaded with dirt may travel with a lower ground speed, as compared to the skid steer with an empty bucket. In many work vehicles that utilize hydrostatic drives, an operator electronically controls the ground speed using a hand throttle, foot pedal, and/or a joystick from the cabin of the vehicle.

During conventional operation of a work vehicle equipped with a hydrostatic drive, the operator may default to setting the engine speed at high idle. High idle ensures that the engine provides enough power to the hydraulic pump, which in turn provides sufficient fluid flow to the hydraulic motor to meet the top ground speed requirements. For this scenario, high idle may be an appropriate setting for the engine speed. However, most of time the vehicle is carrying a heavy load at low travel speed, less flow is required by the hydraulic motor and, thus, the engine high idle setting is not a fuel-efficient manner in which to operate the work vehicle. Setting the engine at lower speed or throttle, while controlling hydrostatic pump swash to compensate the ground speed, improves the vehicle fuel economy. This benefit is maximized when the engine speed is set near the best efficiency region on its fuel map.

BRIEF DESCRIPTION

This summary is provided to introduce a selection of concepts that are further described below in the detailed description. This summary is not intended to identify key or essential features of the claimed subject matter, nor is it intended to be used as an aid in limiting the scope of the claimed subject matter.

In certain embodiments, a system includes a vehicle controller which includes a memory configured to store instructions and one or more processors. The vehicle controller is configured to set a fuel efficient operation mode. The fuel efficient operation mode includes setting a commanded engine speed to a nominal engine speed located within a range of optimal fuel efficiency engine speeds of a brake specific fuel consumption map. The fuel efficient operation mode also includes instructing an engine to operate at the commanded engine speed. The fuel efficient operation mode also includes determining a monitored engine speed. The fuel efficient operation mode also includes adjusting a commanded pump displacement in response to the monitored engine speed exceeding the range of optimal fuel efficiency engine speeds. The fuel efficient operation mode also includes instructing a hydraulic pump to operate at the commanded pump displacement.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Throughout the present disclosure, the term "optimal" is intended to mean achieving a superior or significantly enhanced value, not necessarily a mathematically/perfectly optimal value. Any examples of operating parameters and/or environmental conditions are not exclusive of other parameters/conditions of the disclosed embodiments.

The process of operating a work vehicle, which utilizes a hydraulic drive system (e.g. hydraulic pump and motor), may begin with the operator initially setting the speed of the engine (which powers the hydraulic pump) to a high idle speed, which may not be the most efficient engine speed when operating the work vehicle without an applied load (e.g. bed/bucket full of dirt). The system presented in this disclosure is configured to establish a fuel efficient operation mode. The system includes a vehicle controller which is configured to utilize a break specific fuel consumption map to instruct the engine to operate at a nominal engine speed, which falls within a range of engine speeds corresponding to optimal engine fuel efficiency. The vehicle controller also monitors the engine speed. In response to the engine speed exceeding the range of optimal fuel efficiency engine speeds, the vehicle controller adjusts a commanded pump displacement.

Figure 1:
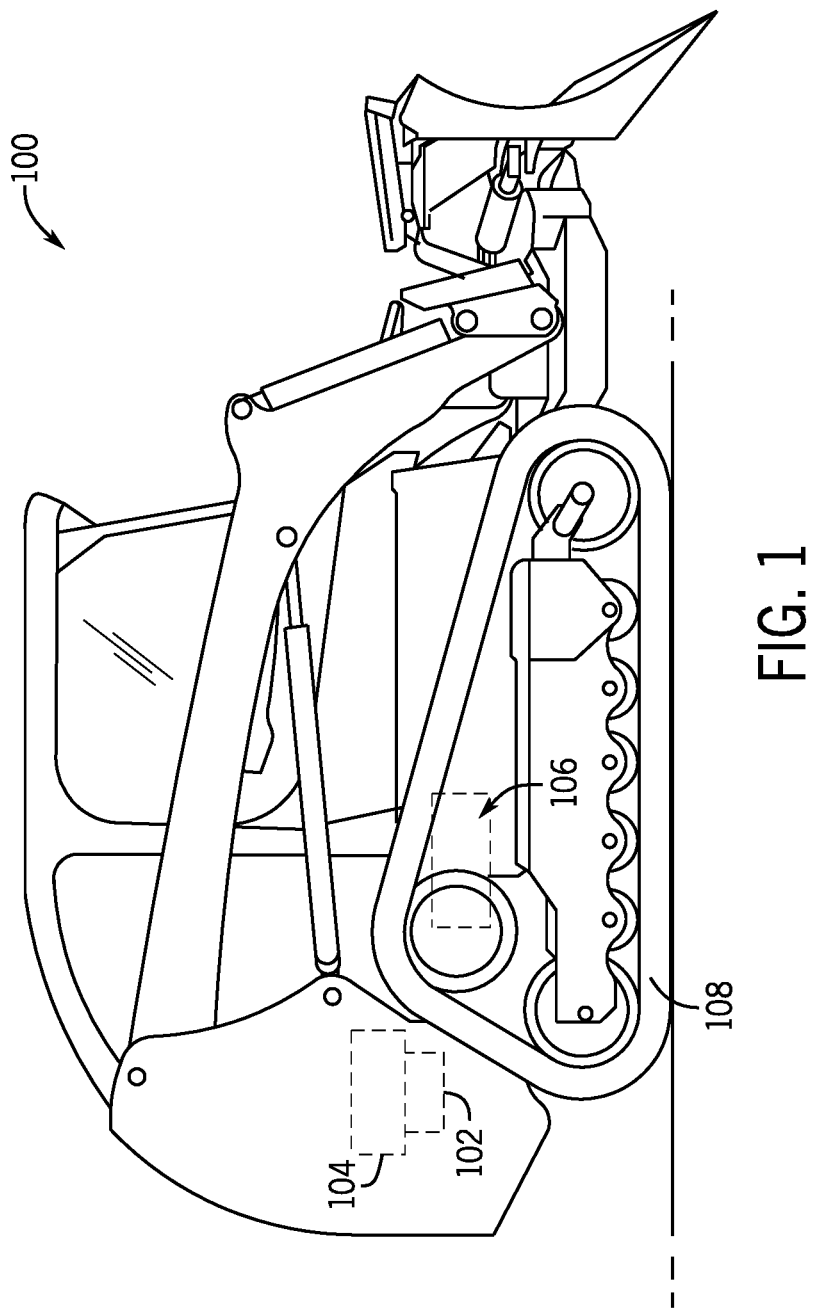
FIG. 1 is a side view of an embodiment of a work vehicle which contains a system used for implementing a fuel efficient operation mode.

With the foregoing in mind, FIG. 1 is a side view of an embodiment of a work vehicle 100 which contains a system used for the fuel efficient operation mode described within this disclosure. The work vehicle 100 includes an engine 102 which is mechanically coupled to and configured to power a hydraulic pump 104. The engine 102 is a variable speed engine and is configured to receive a signal (e.g., throttle command, speed command, power command, etc.) which can adjust the speed of the engine 102. The hydraulic pump 104 is configured to power a hydraulic motor 106 using a hydraulic fluid and is configured to be powered by the engine 102. The hydraulic pump 104 is configured to power the hydraulic motor 106 via hydraulic fluid. Additionally, the hydraulic pump 104 is configured to receive a signal which adjusts a displacement of the hydraulic pump 104. A vehicle controller may output the signal to the hydraulic pump 104 in response to receiving a signal from input device(s) (e.g., lever, pedal, knob, switch, joystick, user interface, etc.). The hydraulic motor 106 is configured to drive the tracks 108 of the work vehicle 100 to rotate. Additionally, the hydraulic motor 106 is configured to receive a signal which adjusts a displacement of the hydraulic motor 106. The vehicle controller may output the signal to the hydraulic motor 106 in response to receiving a signal from the input device(s) (e.g., lever, pedal, knob, switch, joystick, user interface, etc.). In some embodiments, the work vehicle 100 may include a plurality of engines 102, a plurality of hydraulic pumps 104, and/or a plurality of hydraulic motors 106. For example, the work vehicle may include a hydraulic pump and hydraulic motor coupled to a left wheel (e.g., track), and another hydraulic pump and hydraulic motor coupled to a right wheel.

As discussed in detail below, the vehicle controller of the work vehicle 100 is part of the system used for implementing the fuel efficient operation mode. The vehicle controller is configured to output and receive multiple signals. The vehicle controller includes a processor configured to execute a series of instructions and a memory device configured to store the data used for implementing the fuel efficient operation mode. The data stored in the memory device may include a brake specific fuel consumption map.

In certain embodiments, the hydraulic pump 104 is a variable displacement (e.g. axial piston) pump, in which the pistons are arranged in a circle around an input shaft. The displacement of the axial piston pump is varied by adjusting an angle of a swash plate connected to the pistons, thereby adjusting the amount of hydraulic fluid that is pumped per revolution of the input shaft of the hydraulic pump. The swashplate angle may be varied in response to receiving an input from the vehicle controller. The angle of the swashplate may be either positive or negative relative to a neutral angle (e.g. perpendicular to the input shaft), thereby enabling the fluid flow to change directions without changing the direction of rotation of the input shaft of the hydraulic pump. In certain embodiments, the hydraulic pump 104 is a fixed displacement pump with multiple displacement settings. Each setting corresponds to a single discrete displacement and may be selected in response to receiving input from the vehicle controller. As discussed previously, the hydraulic pump 104 is configured to power the hydraulic motor 106 via hydraulic fluid. While certain types of hydraulic pumps are disclosed above, the hydraulic pump 104 may be any suitable type of hydraulic pump with variable/selectable displacement, such as a gear pump, a rotary vane pump, a bent axis pump, or a radial piston pump.

In certain embodiments, the hydraulic motor 106 is a variable displacement (e.g. axial piston) motor, in which the pistons are arranged in a circle around an output shaft. The displacement of the axial piston motor is varied by adjusting an angle of a swash plate connected to the pistons, thereby adjusting the amount of fluid that is received per revolution of the output shaft of the hydraulic motor 106. The swashplate angle may be varied via input device(s) (e.g., lever, pedal, knob, switch, joystick, user interface, etc.) and/or the vehicle controller. The angle of the swashplate may be either positive or negative relative to a neutral angle (perpendicular to the output shaft), thereby enabling the output shaft to change directions without changing the direction of fluid flow to the hydraulic motor 106. As discussed previously, the hydraulic motor 106 is configured to drive the tracks 108 of the vehicle 100 to rotate.

In certain embodiments, the hydraulic motor 106 is a fixed displacement motor with multiple displacement settings. Each setting corresponds to a single discrete displacement and may be selected in response to receiving input from input device(s) (e.g., lever, pedal, knob, switch, joystick, user interface, etc.) and/or the vehicle controller. As discussed previously, the hydraulic motor 106 is configured to drive the tracks 108 of the vehicle 100 to rotate. While certain types of hydraulic motors are disclosed above, the hydraulic motor 106 may be any suitable type of hydraulic motor (e.g., variable displacement, selectable displacement, non-adjustable displacement), such as a vane motor, a gear motor, or a radial piston motor. Furthermore, while the work vehicle 100 includes tracks 108 in the illustrated embodiment, in other embodiments, the work vehicle may include wheels or a combination of wheels and tracks. Furthermore, while the work vehicle 100 is a skid steer in the illustrated embodiment, in other embodiments, the work vehicle may be a tractor, a dozer, an excavator, or any other suitable type of work vehicle.

Figure 2:
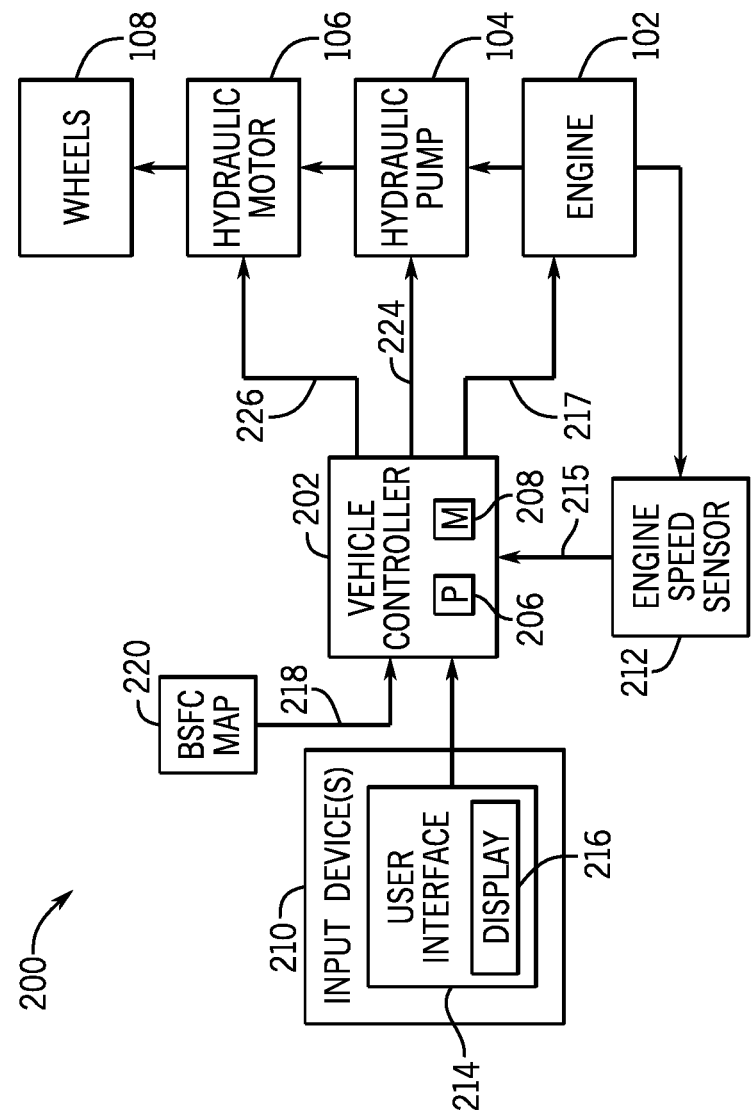
FIG. 2 is a block diagram of an embodiment of a system used to implement the fuel efficient operation mode, which may be employed within the work vehicle of FIG. 1.

FIG. 2 is a block diagram of an embodiment of a system 200 used for implementing the fuel efficient operation mode, which may be employed within the work vehicle of FIG. 1. The system 200 includes electronic components, which include the vehicle controller 202 and the input device(s) 210, and mechanical components, which include the engine 102, the hydraulic pump 104, the hydraulic motor 106, the tracks 108. The vehicle controller 202 includes a processor 206 and a memory device 208. The vehicle controller 202 is communicatively coupled to the input device(s) 210 (e.g., lever, pedal, knob, switch, joystick, user interface, etc.). Additionally, the vehicle controller 202 is communicatively coupled to the engine 102, an engine speed sensor 212, the hydraulic pump 104, and the hydraulic motor 106. In certain embodiments, the vehicle controller 202 may output data/signal(s) to the engine 102, the hydraulic pump 104, and the hydraulic motor 106. Furthermore, in certain embodiments, the vehicle controller 202 may receive data/signal(s) from the input device(s) 210 and the engine speed sensor 212. The user interface 214 includes a display 216.

As previously discussed, the vehicle controller 202 is communicatively coupled to the engine speed sensor 212. In certain embodiments, the vehicle controller 202 is configured to receive a signal from the engine speed sensor 212 indicative of the engine speed. In addition, the vehicle controller 202 is configured to determine a monitored engine speed 215 based on the signal from the engine speed sensor 212. The vehicle controller 202 is an electronic controller comprising electrical circuitry configured to process data received from the engine speed sensor 212 and the input device(s) 210.

In the illustrated embodiment, the vehicle controller 202 is configured to set a fuel efficient operation mode in response to a user selection. While in the fuel efficient operation mode, the vehicle controller 202 sets the commanded engine speed 217 of the engine 102 to a nominal engine speed located within the range of optimal fuel efficiency speeds of a brake specific fuel consumption map. The vehicle controller 202 then instructs the engine 102 to operate at the commanded engine speed 217 and determines a monitored engine speed 215 of the engine 102 based on feedback from the engine speed sensor 212. The vehicle controller 202 then adjusts a commanded pump displacement 224 in response to the monitored engine speed 215 exceeding the range of optimal fuel efficiency speeds. The vehicle controller 202 then instructs the hydraulic pump 104 to operate at the commanded pump displacement 224. In certain embodiments, the vehicle controller 202 (e.g., via the processor(s)) may be configured to adjust (e.g., in response to operator input) the commanded pump displacement 224 based on the monitored engine speed 215 not exceeding the range of optimal fuel efficiency engine speeds.

In certain embodiments, vehicle controller 202 may be configured to receive a signal from the input device(s) 210 (e.g., lever, pedal, knob, switch, joystick, user interface 214, etc.). In response to the vehicle controller 202 receiving the signal from the input device(s) 210, the vehicle controller 202 adjusts the commanded engine speed 217 and instructs (e.g., send a signal to) the engine 102 to match the commanded engine speed 217, thereby pausing (e.g., exiting, temporarily stopping) the fuel efficient operation mode and entering an engine operation mode (e.g., engine speed operation mode).

In certain embodiments, the vehicle controller 202 may be configured to receive a signal from the input device(s) 210 (e.g., lever, pedal, knob, switch, joystick, user interface 214, etc.). In response to the vehicle controller 202 receiving the signal from the input device(s) 210, the vehicle controller 202 may adjust the commanded pump displacement 224, the commanded motor displacement 226, or both. The vehicle controller 202 may then instruct (e.g., send signal(s) to) the hydraulic pump 104, the hydraulic motor 106, or both, to operate at the commanded pump displacement 224 and the commanded motor displacement 226, respectively, thereby pausing (e.g., exiting, temporarily stopping) the fuel efficient operation mode and entering a pump operation mode (e.g., pump displacement operation mode) and/or motor operation mode (e.g., motor displacement operation mode).

In certain embodiments, the vehicle controller 202 is configured to output one or more signals indicative of the commanded engine speed 217, the monitored engine speed 215, the displacement of the hydraulic pump 104 (e.g. commanded and/or monitored), the displacement of the hydraulic motor 106 (e.g. commanded and/or monitored), or a combination thereof, to the display 216 of the user interface 214. The display 216 of the user interface 214 may present an indication of the commanded engine speed 217, the monitored engine speed 215, the displacement of the hydraulic pump 104 (e.g., commanded and/or monitored), the displacement of the hydraulic motor (e.g., commanded and/or monitored), or a combination thereof. The vehicle controller 202 may also output a signal to the display 216 in response to the monitored engine speed 215 exceeding the range of optimal fuel efficiency engine speeds, and the display 216, in response to receiving the signal, may present a corresponding indication (e.g., alert).

As previously discussed, the user interface 214 is communicatively coupled to the vehicle controller 202. The user interface 214 is configured to provide input to the vehicle controller 202 and to receive output from the vehicle controller 202. In certain embodiments, the display 216 of the user interface 214 is a touch screen display 216 configured to receive input from the operator. The user interface 214 may also include other input device(s) (e.g., keyboard, mouse, switches, buttons, etc.) configured to receive input from the operator.

As previously discussed, the vehicle controller 202 is communicatively coupled to the hydraulic pump 104. In certain embodiments, the controller 202 is configured to control the pump displacement by changing a swash plate angle. Furthermore, as previously discussed, the vehicle controller 202 is communicatively coupled to the hydraulic motor 106. In certain embodiments, the vehicle controller 202 is configured to control the motor displacement by changing a swash plate angle.

In certain embodiments, the vehicle controller 202 includes one or more storage devices and/or other suitable components. The processor 206 is used to execute software, such as software for determining the monitored engine speed, adjusting the commanded pump displacement 224, and so forth. Moreover, the processor 206 may include multiple microprocessors, one or more "general-purpose" microprocessors, one or more special-purpose microprocessors, one or more application specific integrated circuits (ASICS), and/or one or more field-programmable gate arrays (FPGA), or some combination thereof. For example, the processor 206 may include one or more reduced instruction set (RISC) processors.

In certain embodiments, the memory device 208 includes a volatile memory, such as random access memory (RAM), and/or a nonvolatile memory, such as read-only memory (ROM). The memory device 208 may store a variety of information and may be used for various purposes. For example, the memory device 208 may store processor-executable instructions (e.g., firmware or software) for the processor 206 to execute, such as instructions for setting the commanded engine speed 217, adjusting the commanded hydraulic pump displacement 224, determining the monitored engine speed 215, and so forth. The storage device(s) (e.g., nonvolatile storage) may include ROM, flash memory, a hard drive, or any other suitable optical, magnetic, or solid-state storage medium, or a combination thereof. The storage device(s) may store data (e.g., the brake specific fuel consumption map, etc.), instructions (e.g., software or firmware for determining the monitored engine speed, adjusting the commanded hydraulic pump displacement, etc.), and any other suitable data.

In certain embodiments, the vehicle controller 202 outputs data (e.g. commanded engine speed) to an engine controller. The engine controller receives the data from the vehicle controller 202 and controls the engine 102 based on the data. Accordingly, the vehicle controller 202 does not directly communicate with the engine 102.

Figure 3:
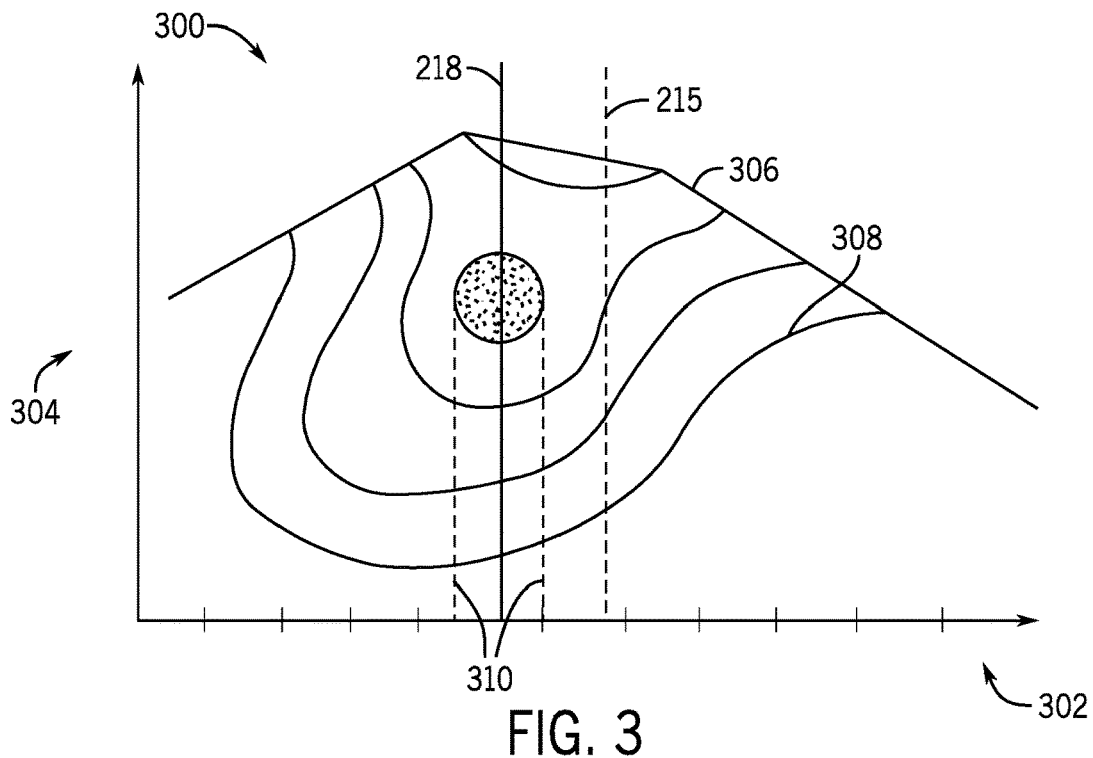
FIG. 3 is an embodiment of a brake specific fuel consumption map that may be stored within a memory device of the system of FIG. 2.

FIG. 3 is an embodiment of a brake specific fuel consumption map 300 that may be stored within the memory device of the system of FIG. 2. The brake specific fuel consumption map 300 relates the engine speed of the engine to a fuel efficiency of the engine. The x-axis of the brake specific fuel consumption map 300 corresponds to the engine speed (e.g., RPM) 302 of the engine, and the y-axis corresponds to the engine torque 304 (e.g., lb.-ft.) of the engine. Additionally, the brake specific fuel consumption map 300 includes an engine torque curve 306, which provides the available engine torque of the engine for a given engine speed 302. Below the torque curve are multiple contours 308 representing varying levels of fuel efficiency. The inner-most contour represents the region with the highest fuel efficiency (lowest fuel consumption). The engine speeds which bound this inner-most contour correspond to the range of optimal fuel efficiency engine speeds 310 for which the fuel efficiency of the engine is optimal. The vehicle controller is configured to determine the nominal engine speed 218, such that the nominal engine speed 218 falls within the range of optimal fuel efficiency engine speeds 310.

In certain embodiments, the range of optimal fuel efficiency engine speeds 310 is adjustable. The range of optimal fuel efficiency engine speeds 310 may be widened or narrowed and may be adjusted via the user interface. In certain embodiments, the brake specific fuel consumption map 300 and/or the range of optimal fuel efficiency engine speeds 310 may be updated automatically (e.g., using a mathematical or statistical algorithm) based on one or more sensor readings. For example, the brake specific fuel consumption map may be updated based on factors including ambient temperature, current weight of the work vehicle, orientation/incline of the work vehicle, or a combination thereof.

In certain embodiments, the brake specific fuel consumption map 300 may be determined based on a mathematical and/or statistical model that is dependent on one or more input variables. The variables may include the size of the engine, the output torque of the engine, the expected ground speed of the work vehicle, the weight of the load carried by the work vehicle, the type of fuel used to power the engine, other suitable variables, or a combination thereof. In certain embodiments, the brake specific fuel consumption map 300 may be used to determine the fuel efficiency of the engine based on the engine torque or the speed of the engine.

In certain embodiments, the brake specific fuel consumption map may include multiple ranges of optimal fuel efficiency engine speeds of the engine (e.g. two ranges, three ranges, etc.) corresponding to varying levels of fuel efficiency (e.g. 30% efficiency, 40% efficiency, etc.) of the engine. Each level of fuel efficiency corresponds to a width of a respective range of optimal fuel efficiency engine speeds. For example, a higher fuel efficiency level corresponds to a narrower range of optimal fuel efficiency engine speeds (e.g. smaller width), whereas a lower fuel efficiency level corresponds to a wider range of optimal fuel efficiency engine speeds (e.g. larger width).

In certain embodiments, the brake specific fuel consumption map 300 may be represented as a series of discrete data points, which may be interpolated based on the monitored engine speed. In other embodiments, the brake fuel consumption map 300 may be represented as an empirical formula, spline curve fit, least square curve fit, or a combination thereof. In certain embodiments, the brake specific fuel consumption map 300 may be automatically adjusted over time to reflect the natural decrease in efficiency of the engine. In certain embodiments, the brake specific fuel consumption map 300 may be used as an input to an algorithm which parses the brake specific fuel consumption map 300 and outputs the range of optimal fuel efficiency engine speeds 310. The brake specific fuel consumption map 300 may be determined based on a model of the engine and/or an estimation of fuel efficiency based on empirical testing of the engine.

Figure 4:
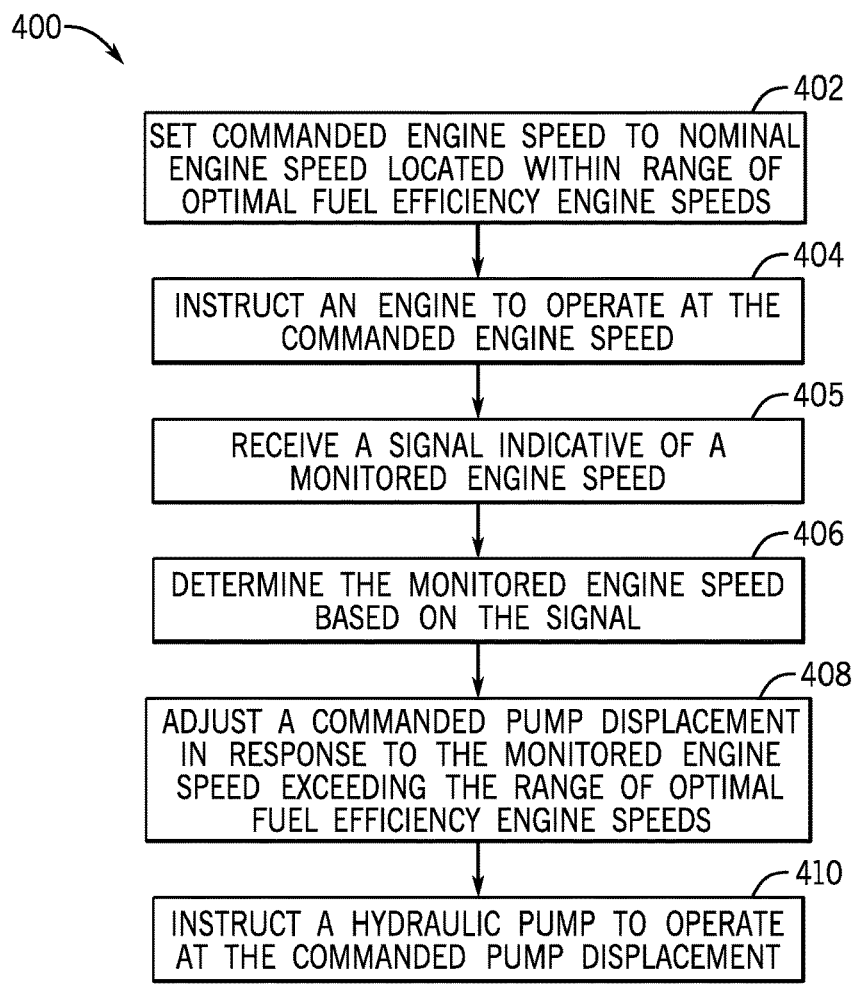
FIG. 4 is a flowchart of an embodiment of a process for implementing a fuel efficient operation mode.

FIG. 4 is a flowchart of an embodiment of a method 400 for implementing a fuel efficient operation mode. The method 400 includes steps 402-410, and the method 400 may be executed by the vehicle controller when the vehicle controller is set to fuel efficient operation mode. In the illustrated embodiment, the method 400 is executed in response to the vehicle controller being set to fuel efficient operation mode, which may be set in response to receiving a signal from the input device(s) (e.g., lever, pedal, knob, switch, joystick, user interface, etc.). The method 400 may be executed iteratively by the vehicle controller (e.g., within a small time increment measured by an internal clock of the vehicle controller). For example, in response to completion of step 410, the vehicle controller may execute method 400 again beginning with step 402.

In step 402, the vehicle controller sets a commanded engine speed to a nominal engine speed located within the range of optimal fuel efficiency engine speeds. In step 404, the vehicle controller instructs the engine to operate at the commanded engine speed. In step 406, the vehicle controller determines a monitored engine speed of the engine based on feedback from the engine speed sensor. In step 408, in response to the observed engine speed exceeding the range of optimal fuel efficiency engine speeds, the vehicle controller adjusts a commanded pump displacement of the hydraulic pump. In step 410, the vehicle controller instructs a hydraulic pump to operate at the commanded pump displacement.

In step 402 of the method 400, in response to the vehicle controller being set to the fuel efficient operation mode, the vehicle controller sets the commanded engine speed to a nominal engine speed located within the range of optimal fuel efficiency engine speeds of the brake specific fuel consumption map. In certain embodiments, the process of updating the nominal engine speed includes updating a nominal engine speed set point, stored either in the memory device or in a separate engine controller. In certain embodiments, the nominal engine speed is the midpoint between the bounds of the range of optimal fuel efficiency engine speeds.

In step 404 of the method 400, the vehicle controller instructs the engine to operate at the commanded engine speed. In certain embodiments, the vehicle controller instructs the engine to operate at the commanded engine speed by outputting a signal directly to the engine. In certain embodiments, the vehicle controller instructs the engine to operate at the commanded engine speed by outputting a signal to an engine controller, which causes the speed of the engine to decrease until the speed of the engine falls within the range of the optimal fuel efficiency engine speeds.

In step 405 of the method 400, the vehicle controller receives a signal from the engine speed sensor indicative of an engine speed. This step may be performed by determining a characteristic of the signal received from the engine speed sensor. For example, the engine speed sensor may be a relative (e.g., incremental) encoder, and the received signal may be in the form of two or more square waves received by the vehicle controller.

In step 406 of the method 400, the vehicle controller determines the monitored engine speed of the engine based on the signal from the engine speed sensor. This step may be performed by converting one or more signals output by one or more sensors into a numerical quantity representing the rotational speed of the engine. The engine speed sensor may be a rotary encoder coupled to the output shaft of the engine. One or more encoders may be used in conjunction with a filter (e.g. low-pass, median, or Kalman filter) to determine the monitored engine speed. For example, the vehicle controller may determine a frequency of a square wave signal received from the encoder and determine the engine speed based on the frequency of the signal received from the encoder.

In step 408 of the method 400, in response to the monitored engine speed exceeding (e.g., above or below) the range of optimal fuel efficiency engine speeds, the vehicle controller adjusts the commanded pump displacement of the hydraulic pump. In step 410 of the method 400, the vehicle controller instructs a hydraulic pump to operate at the commanded pump displacement. In the scenario that the monitored engine speed falls below the range of optimal fuel efficiency engine speeds (e.g. the load on the work vehicle increases), the vehicle controller decreases the commanded pump displacement of the hydraulic pump. The decrease in the displacement of the hydraulic pump decreases the torque sufficient to power the hydraulic pump. Provided that the power output by the engine remains substantially constant, the decrease in torque output by the engine causes the engine speed to increase. In the scenario that the monitored engine speed rises above the range of optimal fuel efficiency engine speeds, the vehicle controller increases the commanded pump displacement of the hydraulic pump. The increase in the displacement of the hydraulic pump increases the torque sufficient to power the hydraulic pump. Provided that the power output by the engine remains substantially constant, the increase in torque output by the engine causes the engine speed to decrease. In the scenario that the monitored engine speed does not exceed the range of optimal fuel efficiency engine speeds, the vehicle controller does not adjust the commanded pump displacement.

In certain embodiments, the vehicle controller is configured to set the fuel efficient operation mode in response to receiving a signal from the input device(s) (e.g., lever, pedal, knob, switch, joystick, user interface, etc.), and the vehicle controller is configured to deactivate the fuel efficient operation mode in response to an absence of the signal or in response to receiving a signal to exit the fuel efficient operation mode. In certain embodiments, the vehicle controller is configured to set the fuel efficient operation mode in response to a startup sequence (e.g. ignition) of the work vehicle.

In certain embodiments the vehicle controller may adjust the commanded pump displacement in response to receiving a signal from the input device(s) (e.g., lever, pedal, knob, switch, joystick, user interface, etc.). Furthermore, while the vehicle controller is in the fuel efficient operation mode, the vehicle controller may adjust the commanded motor displacement in response to receiving a signal from the input device(s) (e.g., lever, pedal, knob, switch, joystick, user interface, etc.). The vehicle controller may then instruct the hydraulic pump, the hydraulic motor, or both, to operate at the commanded pump displacement and the commanded motor displacement, respectively, thereby pausing (e.g., exiting, temporarily stopping) the fuel efficient operation mode and entering a pump displacement and/or motor displacement operation mode.

In certain embodiments, while in the fuel efficient operation mode, the vehicle controller may be configured to temporarily increase and/or decrease the commanded engine speed of the engine from the nominal engine speed in response to receiving a signal from the input device(s) (e.g., lever, pedal, knob, switch, joystick, user interface, etc.) indicative of an adjustment to the engine speed. The vehicle controller may then instruct the engine to operate at the commanded engine speed. In response to termination of the signal indicative of the adjustment to the engine speed and/or receiving a signal from the input device(s) indicative of returning to the nominal engine speed, the vehicle controller may set the commanded engine speed to the nominal engine speed and instruct the engine to operate at the commanded engine speed.

In certain embodiments, while in the fuel efficient operation mode, the vehicle controller may be configured to temporarily increase and/or decrease the commanded pump displacement of the pump from the nominal pump displacement in response to receiving a signal from the input device(s) (e.g., lever, pedal, knob, switch, joystick, user interface, etc.) indicative of an adjustment to pump displacement. The vehicle controller may then instruct the pump to operate at the commanded pump displacement. In response to termination of the signal indicative of the adjustment to the pump displacement and/or receiving a signal from the input device(s) indicative of returning to the nominal pump displacement, the vehicle controller may set the commanded pump displacement to the nominal pump displacement and instruct the pump to operate at the commanded pump displacement.

In certain embodiments, while in the fuel efficient operation mode, the vehicle controller may be configured to temporarily increase and/or decrease the commanded motor displacement of the motor from the nominal motor displacement in response to receiving a signal from the input device(s) (e.g., lever, pedal, knob, switch, joystick, user interface, etc.) indicative of an adjustment to the motor displacement. The vehicle controller may then instruct the motor to operate at the commanded motor displacement. In response to termination of the signal indicative of the adjustment to the motor displacement and/or receiving a signal from the input device(s) indicative of returning to the nominal motor displacement, the vehicle controller may set the commanded motor displacement to the nominal motor displacement and instruct the motor to operate at the commanded motor displacement.

In certain embodiments, while the vehicle controller is in the fuel efficient operation mode, in response to the monitored engine speed exceeding the range of optimal fuel efficiency engine speeds, the vehicle controller adjusts the displacement of the hydraulic pump. For example, in response to the monitored engine speed decreasing to a level below (e.g. exceeding) the range of optimal fuel efficiency engine speeds (e.g. due to the work vehicle moving a heavy load), the vehicle controller (e.g., via the processor(s)) may decrease the displacement of the hydraulic pump until the monitored engine speed returns to the range of optimal fuel efficiency engine speeds. In addition, in response to the monitored engine speed increasing to a level above the range of optimal fuel efficiency engine speeds, the vehicle controller (e.g. via the processor(s)) may increase the displacement of the hydraulic pump until the observed engine speed returns to the range of optimal fuel efficiency engine speeds. The vehicle controller (e.g. via the processor(s)) is configured to maintain the commanded pump displacement at a nominal pump displacement in response to the observed engine speed not exceeding the range of optimal fuel efficiency engine speeds.

In the illustrated embodiment, the operator sets the vehicle controller to fuel efficient operation mode by providing an input to the input device(s) (e.g., lever, pedal, knob, switch, joystick, user interface, etc.). In response to the operator setting the vehicle controller to the fuel efficient operation mode, the vehicle controller smoothly transitions the engine speed from an initial engine speed to the nominal engine speed, which is located within the range of optimal fuel efficiency engine speeds. In certain embodiments, in response to the operator setting the vehicle controller to a standard operation mode (e.g., as compared to the fuel efficient operation mode), the vehicle controller may smoothly transition the speed of the engine from the nominal engine speed to a standard engine speed.

In the illustrated embodiment, the display of the user interface may display the monitored engine speed and whether the monitored engine speed exceeds the range of optimal fuel efficiency engine speeds. Additionally, the user interface may provide an indication if the observed engine speed exceeds the range of optimal fuel efficiency engine speeds.

In certain embodiments, the ground speed of the work vehicle may be adjusted in response to adjusting the commanded pump displacement via the input device(s) (e.g., lever, pedal, knob, switch, joystick, user interface, etc.), in response to adjusting the commanded motor displacement via the input device(s), or a combination thereof.

In certain embodiments, the input device(s) (e.g., lever, pedal, knob, switch, joystick, user interface, etc.) may be used to control the ground speed of the vehicle. For example, an operator may input a command to the input device(s) to enter a brake mode. In response, the input device(s) may output a corresponding signal to the vehicle controller. In response to receiving the signal from the input device(s), the vehicle controller may adjust the pump displacement and/or the motor displacement, thereby adjusting the ground speed of the work vehicle.

In certain embodiments, while the fuel efficient operation mode is active, in response to the monitored engine speed exceeding the range of optimal fuel efficiency engine speeds, the vehicle controller may adjust a displacement of the hydraulic motor in addition to the displacement of the hydraulic pump. For example, in the scenario that the monitored engine speed falls below the range of optimal fuel efficiency engine speeds (e.g. the load on the work vehicle increases), the vehicle controller increases the commanded motor displacement of the hydraulic motor. The increase in the displacement of the hydraulic motor decreases the pressure of the fluid output by the hydraulic pump sufficient to power the hydraulic motor. Provided that the power output by the engine remains substantially constant, the decrease in pressure sufficient to operate the hydraulic motor decreases the amount of work performed by the hydraulic pump, thereby causing the engine speed to increase. In the scenario that the monitored engine speed rises above the range of optimal fuel efficiency engine speeds, the vehicle controller decreases the commanded motor displacement of the hydraulic motor. The decrease in the displacement of the hydraulic motor increases the pressure of the fluid output by the hydraulic pump sufficient to power the hydraulic motor. Provided that the power output by the engine remains substantially constant, the increase in pressure sufficient to run the hydraulic motor increases the amount of work performed by the hydraulic pump, thereby causing engine speed to decrease. In the scenario that the monitored engine speed does not exceed the range of optimal fuel efficiency engine speeds, the vehicle controller does not adjust the commanded motor displacement In certain embodiments, the vehicle controller provides the commanded engine speed as an engine speed set point to an engine controller. The engine controller receives the commanded engine speed and the monitored engine speed, determined via feedback from the engine speed sensor, and uses a control algorithm to adjust the monitored engine speed to match the commanded engine speed. In certain embodiments, the control algorithm includes a proportional, integral, derivative (PID) algorithm with adjustable proportional, integral, and/or derivative gains.

In certain embodiments, the fuel efficient operation mode may be set to varying levels of efficiency. For example, the fuel efficient operation mode may include three subordinate operating modes corresponding to medium, medium-high, and high fuel efficiency. The medium efficiency option may correspond to a wider range of optimal fuel efficiency engine speeds provided by the brake specific fuel consumption map, whereas the high efficiency option may correspond to a narrower range of optimal fuel efficiency engine speeds provided by the brake specific fuel consumption map. In response to activating the fuel efficient operation mode, the operator may select a subordinate operating mode by applying an action to input device(s) (e.g., lever, pedal, knob, switch, joystick, user interface, etc.).

In certain embodiments, the display of the user interface is configured to display parameters corresponding to the status of the work vehicle, including the ground speed of the work vehicle, the displacement of the hydraulic pump, the displacement of the hydraulic motor, the commanded engine speed, the nominal engine speed, the monitored engine speed, the amount of fuel conserved during use of the fuel efficient operation mode, or a combination thereof.

In certain embodiments, the vehicle controller may automatically select the fuel efficient operation mode in response to one or more triggers. For example, the vehicle controller may receive a signal output from a load sensor, which is configured to monitor the load moved by the work vehicle, and may automatically set the fuel efficient operation mode in response to the load exceeding a threshold value. A timer and/or calendar may be used to schedule the fuel efficient operation mode to be set for certain time(s) of day and/or for certain duration(s) of time. All parameters related to scheduling the fuel efficient operation mode may be displayed by the display of the user interface.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
    a vehicle controller, wherein the vehicle controller comprises:
        a memory configured to store instructions; and
        one or more processors, wherein the vehicle controller is configured to:
            set a fuel efficient operation mode, wherein the fuel efficient operation mode comprises:
                setting a commanded engine speed to a nominal engine speed located within a range of optimal fuel efficiency engine speeds of a brake specific fuel consumption map;
                instructing an engine to operate at the commanded engine speed;
                determining a monitored engine speed;
                adjusting a commanded pump displacement in response to the monitored engine speed exceeding the range of optimal fuel efficiency engine speeds; and
                instructing a hydraulic pump to operate at the commanded pump displacement.

2. The system of claim 1, wherein the vehicle controller is configured to transition from the fuel efficient operation mode to an engine operation mode, the engine operation mode comprising:
  receiving a signal from an input device;
  adjusting the commanded engine speed in response to receiving the signal; and
  instructing the engine to operate at the commanded engine speed.

3. The system of claim 1, wherein the vehicle controller is configured to transition from the fuel efficient operation mode to a pump operation mode, the pump operation mode comprising:
  receiving a signal from an input device;
  adjusting the commanded pump displacement in response to receiving the signal; and
  instructing the pump to operate at the commanded pump displacement.

4. The system of claim 1, wherein the vehicle controller is configured to transition from the fuel efficient operation mode to a motor operation mode, the motor operation mode comprising:
  receiving a signal from an input device;
  adjusting a commanded motor displacement in response to receiving the signal; and
  instructing the motor to operate at the commanded motor displacement.

5. The system of claim 3, wherein adjusting the commanded pump displacement comprises:
  decreasing the commanded pump displacement in response to the monitored engine speed falling below the range of optimal fuel efficiency engine speeds; and
  increasing the commanded pump displacement in response to the monitored engine speed rising above the range of optimal fuel efficiency engine speeds.

6. The system of claim 4, wherein adjusting the commanded motor displacement comprises:
  increasing the commanded motor displacement in response to the monitored engine speed falling below the range of optimal fuel efficiency engine speeds; and
  decreasing the commanded motor displacement in response to the monitored engine speed rising above the range of optimal fuel efficiency engine speeds.

7. The system of claim 1, wherein the vehicle controller is configured to set the fuel efficient operation mode in response to receiving a signal from a user interface.

8. The system of claim 1, wherein the fuel efficient operation mode comprises maintaining the commanded pump displacement at a nominal pump displacement in response to the monitored engine speed not exceeding the range of optimal fuel efficiency engine speeds.

9. A method comprising:
  setting, via a controller having a memory and a processor, a commanded engine speed to a nominal engine speed located within a range of optimal fuel efficiency engine speeds of a brake specific fuel consumption map;
  instructing, via the controller, an engine to operate at the commanded engine speed;
  determining, via the controller, a monitored engine speed;
  adjusting, via the controller, a commanded pump displacement in response to the monitored engine speed exceeding the range of optimal fuel efficiency engine speeds; and
  instructing, via the controller, a hydraulic pump to operate at the commanded pump displacement.

10. The method of claim 9, comprising maintaining, via the controller, the commanded pump displacement at a nominal pump displacement in response to the monitored engine speed not exceeding the range of optimal fuel efficiency engine speeds.

11. The method of claim 9, comprising:
  decreasing, via the controller, the commanded pump displacement in response to the monitored engine speed falling below the range of optimal fuel efficiency engine speeds; and
  increasing, via the controller, the commanded pump displacement in response to the monitored engine speed rising above the range of optimal fuel efficiency engine speeds.

12. A work vehicle, comprising:
  a hydrostatic drive, comprising:
    a motor;
    a pump configured to provide hydraulic fluid to the motor;
    an engine configured to power the pump; and
    a vehicle controller, wherein the vehicle controller comprises:
      a memory configured to store instructions; and
      a one or more processors configured to execute the instructions, wherein the vehicle controller is configured to set a fuel efficient operation mode, wherein the fuel efficient operation mode comprises:
        setting a commanded engine speed to a nominal engine speed located within a range of optimal fuel efficiency engine speeds of a brake specific fuel consumption map;
        instructing the engine to operate at the commanded engine speed;
        determining a monitored engine speed;
        adjusting a commanded pump displacement in response to the monitored engine speed exceeding the range of optimal fuel efficiency engine speeds; and
        instructing a hydraulic pump to operate at the commanded pump displacement.

13. The work vehicle of claim 12, wherein the brake specific fuel consumption map comprises a plurality of ranges corresponding to a plurality of levels of fuel efficiency, and the vehicle controller is configured to select the range of optimal fuel efficiency engine speeds from the plurality of ranges in response to operator input.

14. The work vehicle of claim 12, wherein the vehicle controller is configured to output a signal indicative of instructions to present an indication in response to the monitored engine speed exceeding the range of optimal fuel efficiency engine speeds.

15. The work vehicle of claim 12, wherein the vehicle controller is configured to set the fuel efficient operation mode in response to a startup sequence of the work vehicle, a signal received by an input device, or a combination thereof.

16. The work vehicle of claim 12, wherein the vehicle controller is configured to transition from the fuel efficient operation mode to an engine operation mode, the engine operation mode comprising:
  receiving a signal from an input device;
  adjusting the commanded engine speed in response to receiving the signal; and
  instructing the engine to operate at the commanded engine speed.

17. The work vehicle of claim 12, wherein the vehicle controller is configured to transition from the fuel efficient operation mode to a pump operation mode, the pump operation mode comprising:
- receiving a signal from an input device;
- adjusting the commanded pump displacement in response to receiving the signal; and
- instructing the pump to operate at the commanded pump displacement.

18. The work vehicle of claim 12, wherein the vehicle controller is configured to transition from the fuel efficient operation mode to a motor operation mode, the motor operation mode comprising:
- receiving a signal from an input device;
- adjusting a commanded motor displacement in response to receiving the signal; and
- instructing the motor to operate at the commanded motor displacement.

19. The work vehicle of claim 17, wherein adjusting the commanded pump displacement comprises:
- decreasing the commanded pump displacement in response to the monitored engine speed falling below the range of optimal fuel efficiency engine speeds; and
- increasing the commanded pump displacement in response to the monitored engine speed rising above the range of optimal fuel efficiency engine speeds.

20. The work vehicle of claim 18, wherein adjusting the commanded motor displacement comprises:
- increasing the commanded motor displacement in response to the monitored engine speed falling below the range of optimal fuel efficiency engine speeds; and
- decreasing the commanded motor displacement in response to the monitored engine speed rising above the range of optimal fuel efficiency engine speeds.

* * * * *